Oct. 8, 1957  M. H. LADEN ET AL  2,809,021
AGITATOR FOR VISCOUS LIQUIDS
Filed March 21, 1955  2 Sheets-Sheet 2
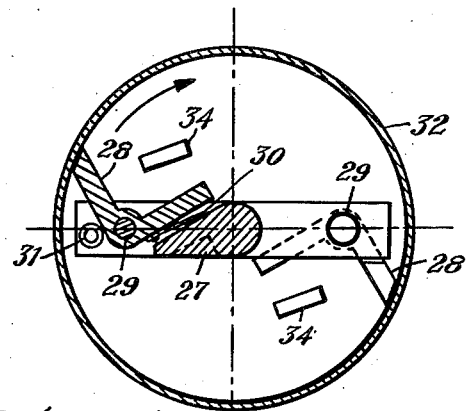
Fig. 4
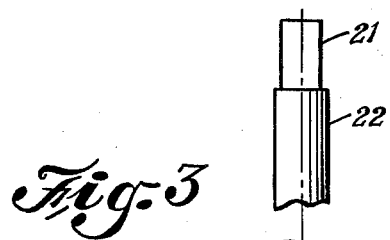
Fig. 3
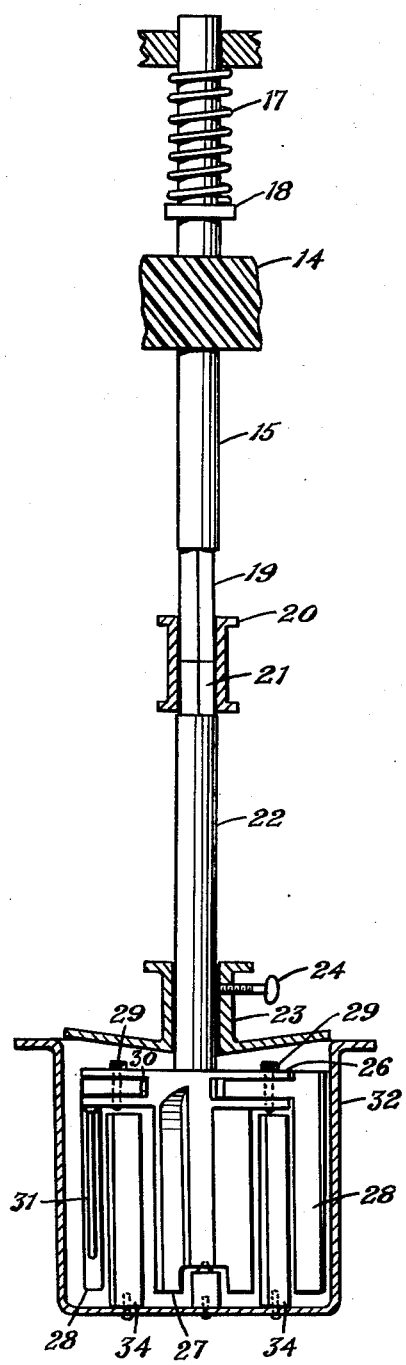
Fig. 2
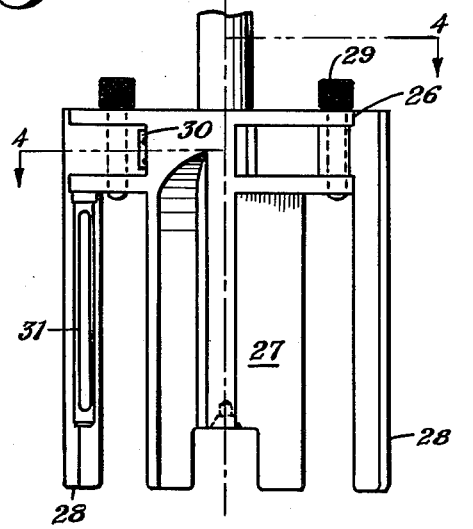
HENRY HERTWIG
MAX H. LADEN
INVENTORS
BY R. G. Story
ATTORNEY United States Patent Office 2,809,021
Patented Oct. 8, 1957

2,809,021
AGITATOR FOR VISCOUS LIQUIDS

Max H. Laden, Cicero, and Henry Hertwig, Chicago, Ill., assignors to Swift & Company, Chicago, Ill., a corporation of Illinois Application March 21, 1955, Serial No. 495,516

3 Claims. (Cl. 259—107)

This invention relates in general to apparatus for stirring high viscosity substances. More particularly, the invention relates to an apparatus which is capable of agitating the entirety of a batch of viscous material, such as an adhesive, so as to obtain an even flow pattern within the mixture, to insure thorough mixing and a uniform temperature throughout the viscous mass, to measure the temperature while mixing during the whole heating and/or cooling cycle of the process, and to minimize solvent loss. The invention is particularly applicable to laboratory scale apparatus.

Present methods of stirring by hand during the heat processing of various adhesive formulations are inadequate. The so obtained laboratory samples are not uniform from batch to batch. They differ frequently in viscosity due to differences of agitation and non-uniform heating or cooling throughout the adhesive mass. This is especially true of starch formulations such as caustic soda conversions which are very much affected by the degree of mechanical agitation and variations of temperature. This applies also to other adhesives such as dextrins, proteins, resin emulsions, etc.

Mechanical agitation such as high speed paddle-type mixers during processing creates a vortex in adhesives of low viscosity and entraps air which leads to erroneous viscosity readings. If the adhesive becomes very viscous, it usually is pulled off the walls and is wrapped around the agitator, resulting in poor mixing and caking of adhesive material (especially starch) to the heated wall of the container.

Consequently, duplication of results from batch to batch is impossible.

Conventional paddle-type circular mixers do not permit a simple installation of a thermometer to measure the temperature of the viscous mass during agitation.

The invention uses therefore vertical rotating and vertical stationary mixing rods thus permitting the attachment of a "Weston" type thermometer to one of the mixing rods. To minimize loss of solvent during mixing and heating, a conical cover is attached to the agitator shaft.

Accordingly, it is an object of this invention to provide an apparatus which is capable of providing constant and uniform agitation throughout the mass of any given liquid or semi-liquid, regardless of how viscous.

It is another object of this invention to provide an apparatus which operates so as to preclude the formation of dead spots in a mass of liquid material, either near the walls of the container or in the center of the liquid.

Still another object of this invention is to provide an apparatus which can prevent adherence of a viscous substance undergoing mixing to its container walls even where the container itself is not perfectly circular or is of an unusual diameter.

A further object of this invention is the measurement of the average temperature of the viscous mass while it is being agitated.

Also, an object of this invention is to minimize the loss of solvent during processing.

Further objects and advantages of this invention, if not specifically set out, will become apparent to one skilled in the art during the course of the discussion which follows.

Broadly, the device contemplated comprises a suitable container, preferably metal, glass or plastic, for the liquid to be mixed, having mounted therein a plurality of stationary fingers which protrude upwardly from the container bottom. Cooperating with these finger members is a stirrer assembly which is connected to a suitable power source whereby to enable sustained and uniform rotation of the portion of the stirrer extending into the liquid retaining vessel. The stirrer itself comprises a plurality of downwardly extending paddles or dashes. These members are so mounted that a somewhat sharp leading surface is yieldably urged against the longitudinally extending container wall. These paddles serve to scrape the container wall and direct the liquid being mixed to a point more nearly in the center of the vessel. Also depending from the rotating shaft which carries the peripheral scrapers is a centrally positioned paddle or dash. This, like the others, is fixedly mounted on the rotating shaft but unlike the others is mounted substantially coaxially with the rotating shaft. This centrally disposed dash prevents the formation of a vortex in the center of the mixing liquid. All paddles are so arranged and disposed that their movement is not interfered with by the stationary upright fingers mounted in the bottom of the container. That is, the rotating paddles straddle the fixedly mounted fingers.

In the drawings:

Figure 2 is a side elevation partially in section showing the liquid container and the stirring mechanism with its supporting shaft.

Figure 3 is a side elevational view showing only the stirring mechanism fitted with a thermometer holder.

Figure 4 is a top view partially in section showing the liquid container and the relationship thereto of the stirring apparatus. The rotatable portion of the apparatus is shown along the line 4—4 of Figure 3.

Figure 1:
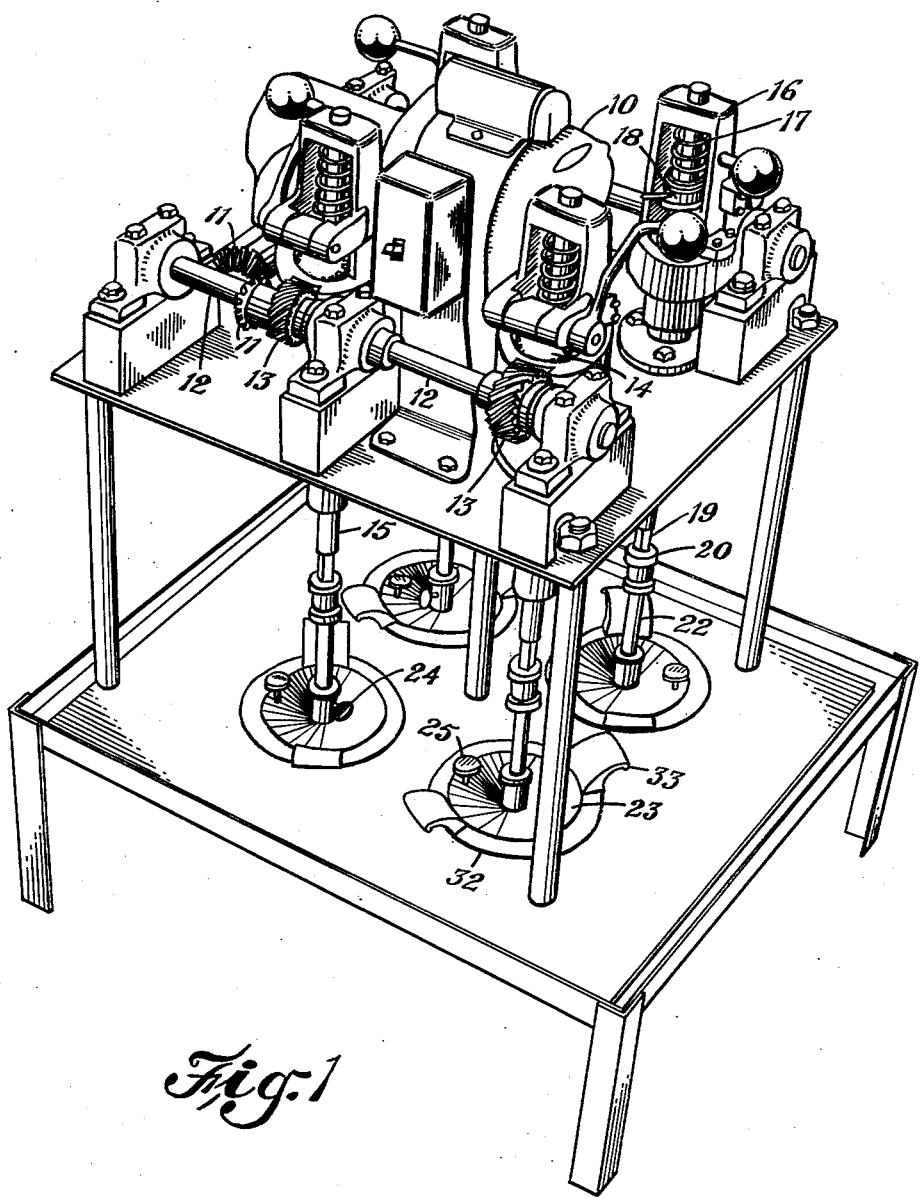
Figure 1 is a view in perspective of four of the stirrer-container units operatively connected to a single electric motor.

Referring now to the drawings in which like characters refer to like parts throughout; the apparatus comprises a frame member having upper and lower tabular surfaces. Mounted on the uppermost of these tabular supporting members is an electric motor 10. The one depicted here is of the double output shaft type so that a plurality of liquid batches can be stirred simultaneously. The output shafts are coupled through mitre gears 11 to counter shafts 12 which are in turn connected through helical gears 13 and 14 to the drive shafts supporting the stirring mechanisms.

These shafts 15 may be provided with bearings if desired at points where they are journaled in their respective housings 16 and at points where they pass through the upper tabular member. Preferably coil and helical springs 17 abut against a collar or flange 18 on each drive shaft and against a portion of the shaft housing whereby to exert a downward pressure on the drive shafts and keep the stirring mechanism properly seated.

The downwardly extending drive shafts have squared ends 19 which are by means of couplings 20 secured to the squared ends 21 of driven shafts 22.

Mounted on these driven shafts are lids 23 in the shape of inverted cones which are equipped with suitable means for fixedly securing them in place on the shafts. Locking screws 24 extending through the lid collars are illustrated. Preferably, the lids are provided with suitably sized holes to accommodate thermometers 25.

Considering now the structure of the stirring mechanism itself, each driven shaft 22 supports a horizontally extending slotted dash support 26. This member extends on opposite sides of the supporting shaft. Extending downwardly from substantially the center of the dash support is a central paddle 27. This paddle is mounted substantially coaxially with the shaft 22. Depending from either end of the dash support 26 are outer dashes or paddles 28. These paddles are pivotally mounted in the slotted portions of the dash supports by means of pins 29. The leading edges of these pivotally mounted paddles are urged outwardly by means of springs 30 (one of which is not shown). Preferably positioned at one end of the dash support is a thermometer guard and holder 31.

Referring back to Figure 1, located at convenient spots about the lower tabular surface of the frame are one or more holes or indentations suitable for receiving substantially circular liquid containers 32. These containers are preferably fitted with handles 33 to facilitate their removal when cleaning or replacement is in order. As can be seen in Figures 2 and 4, these containers are each equipped with a plurality of upright fingers 34. These are fixedly secured to the bottom of each container, are preferably mounted at approximately right angles to the forwardly extending scraper paddles 28 (when viewed from above) and are necessarily so positioned that they may be straddled and not encountered by paddles 27 or 28.

In operation, liquid containers 32 are filled with the mass to be agitated and mixed. The stirring assemblies are lowered into place and the lids 23 securely fastened with locking screws 24 and the thermometers 25 inserted. Power is supplied by motor 10 through mitre gears 11 to counter shafts 12. These shafts in turn communicate through helical gears 13 and 14 with drive shafts 15. The drive shafts rotate and thereby turn driven shafts 22 and eventually the stirring mechanisms themselves.

The pivotally mounted paddles or dashes 28 are urged by means of springs 30 into contiguity with the inner walls of each liquid container 32. Thus, regardless of any variations in diameter from container to container and regardless of the fact that all vessels may not be entirely circular, the inner surface of each is constantly scraped and viscous material dislodged therefrom and thrown backward against the diagonally placed surface of a dash. Thus, the liquid is diverted to a point near the center of the container where it is contacted by central dash 27. This paddle in turn directs the viscous material away from the center of the container and toward the peripheral paddles.

The combined effect of both sets of paddles is a constant and even circulation. In fact, the action is in the nature of a vigorous swirling. As the mixing operation progresses, temperature readings can be taken without sliding thermometer 25 out of its well.

Thus, it is seen that the apparatus of this invention provides means for evenly and vigorously mixing liquids, particularly those which are viscous and difficult to move from place to place in a vessel, such as adhesives. The apparatus may be assembled so that a large number of liquid samples can be mixed simultaneously, as preferred, or alternatively, a single mixing assembly may be set up and operated.

Desirably, of course, the elements should be manufactured with an eye to their use. Parts which are to come into contact with corrosive substances should be made from stainless steel or some other corrosion resistant substance. They should also be sturdy enough to resist the stresses produced when extremely viscous glue-like materials are mixed.

The apparatus may be further modified and improved by providing it with temperature control means. For example, hot or cold water may be circulated about these containers.

Finally, while a cylindrical liquid container has been described, it is to be recognized that the adaptation of the mixing apparatus to a hemispherical or spherical vessel could be easily accomplished. It is simply necessary to employ peripheral or scraping paddles of a crescent shape.

Obviously, many modifications and variations of the invention as hereinbefore set forth may be made without departing from the spirit and scope thereof, and therefore only such limitations should be imposed as are indicated in the appended claims.

We claim:

1. Apparatus for agitating a viscous liquid comprising: a vessel substantially circular in cross section; a rotatable shaft mounted concentrically with and above said vessel; a plurality of paddles depending from said shaft extending into said vessel; a substantially circular lid secured to said rotatable shaft above said paddles, said lid being rotatable with said shaft and forming a closure for said vessel, said lid having an aperture disposed between its periphery and said shaft; a temperature indicator extending through said aperture into said vessel to provide means for determining the temperature within said vessel; and means within said vessel to support said temperature indicator.

2. Apparatus for agitating a viscous liquid comprising: a vessel substantially circular in cross section, a rotatable shaft mounted concentrically with and above said vessel; a plurality of paddles depending from said shaft extending into said vessel, one of said paddles being mounted approximately along the axis of the circle described by said vessel and the remainder of said paddles being spaced remotely from said axially positioned paddle, at least one of said remote paddles having an edge thereof normally urged against a wall of said vessel whereby to exert a scraping action when said paddle is rotated; a substantially circular lid secured to said rotatable shaft above said paddles, said lid being rotatable with said shaft and forming a closure for said vessel, said lid having an aperture disposed between its periphery and said shaft; a temperature indicator extending through said aperture into said vessel to provide means for determining the temperature within said vessel; and means within said vessel to support said temperature indicator.

3. Apparatus for agitating a viscous liquid comprising: a substantially circular vessel; a rotatable shaft mounted concentrically with and above said vessel; a dash support fixed to said shaft within said vessel; a plurality of paddles depending from said support, a paddle at one end of said support having an edge thereof normally urged against a wall of said vessel to scrape said wall; a temperature indicator guard member depending from said dash support; a substantially circular lid secured to said rotatable shaft above said support, said lid being rotatable with said shaft and forming a closure for said vessel, said lid having an aperture disposed in alignment with said guard member; and a temperature indicator extending through said aperture into said guard within the vessel to provide means for determining the temperature within the vessel while said lid is in a closed position.

References Cited in the file of this patent

UNITED STATES PATENTS

| 9,008 | St. John | June 8, 1852 |
|---|---|---|
| 83,069 | Lafetra | Oct. 13, 1868 |
| 172,475 | Packer | Jan. 18, 1876 |
| 191,562 | Borland | June 5, 1877 |
| 560,995 | Hopkins | May 26, 1896 |
| 594,533 | Henius | Nov. 30, 1897 |
| 876,363 | Lauerman | June 14, 1908 |
| 1,808,507 | Poole | June 2, 1931 |
| 2,082,752 | Lewis et al. | June 1, 1937 |

FOREIGN PATENTS

| 3,434 | Germany | Jan. 16, 1879 |
|---|---|---|
| 308,896 | Italy | June 19, 1933 |
| 310,701 | Great Britain | May 2, 1929 |
| 329,431 | Italy | Sept. 9, 1935 |